(12) United States Patent
Savir et al.

(10) Patent No.: US 12,189,615 B2
(45) Date of Patent: Jan. 7, 2025

(54) AUTOMATED CREATION OF OPTIMIZED PERSISTENT DATABASE VIEWS

(71) Applicant: Dell Products L.P., Round Rock, TX (US)

(72) Inventors: Amihai Savir, Newton, MA (US); Ofir Ezrielev, Be'er Sheva (IL); Oshry Ben Harush, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 7 days.

(21) Appl. No.: 17/970,200

(22) Filed: Oct. 20, 2022

(65) Prior Publication Data

US 2024/0134845 A1   Apr. 25, 2024
US 2024/0232176 A9   Jul. 11, 2024

(51) Int. Cl.
*G06F 16/23* (2019.01)
*G06F 11/34* (2006.01)
*G06F 16/2455* (2019.01)

(52) U.S. Cl.
CPC ...... *G06F 16/2393* (2019.01); *G06F 11/3409* (2013.01); *G06F 16/24554* (2019.01)

(58) Field of Classification Search
CPC ............ G06F 16/2393; G06F 16/2445; G06F 16/24554; G06F 11/3409; G06F 11/3447; G06F 11/321; G06F 11/3442; G06F 11/3495; G06F 2201/865; G06F 11/00; G06F 11/301; G06F 2201/815; G06F 11/324; G06F 11/328; G06F 11/3419; G06F 11/3452; G06F 11/3466; G06F 16/245; G06F 16/2477; G06F 2201/86; G06F 2201/81; G06F 3/0482; G06F 3/0481; G06F 9/542; H04L 43/16; H04L 41/147; H04L 41/069; H04L 43/04; H04L 43/045;
(Continued)

(56) References Cited

U.S. PATENT DOCUMENTS

2016/0285707 A1* 9/2016 Pawlowski ......... H04L 67/1097
2017/0085446 A1* 3/2017 Zhong .................... H04L 41/12
2017/0344618 A1* 11/2017 Horowitz ................ G06F 16/27
(Continued)

OTHER PUBLICATIONS

Zhang, C., (1999). Article: "Genetic Algorithm for Materialized View Selection in Data Warehouse Environments." In: Mohania, M., Tjoa, A.M. (eds) Data Warehousing and Knowledge Discovery. DaWaK 1999. Lecture Notes in Computer Science, vol. 1676. Springer, Berlin, Heidelberg. Published Mar. 1, 2002 (Year: 2002).*

*Primary Examiner* — Evan Aspinwall
(74) *Attorney, Agent, or Firm* — Staniford Tomita LLP (57) ABSTRACT

Embodiments for automatically optimizing and persisting database views by receiving queries made to a database, wherein each query generates a respective database view, and generating a set of database maintained views generated by the queries. The system obtains, for each generated view, certain telemetry information about a respective view including latency, memory space utilization, and processor utilization, among other factors. It then scores each view of the generated views based on an base score modified by the obtained information to determine which one or more of the generated views to make persistent, and maintains the one or more persistent views to produce an optimized persistent set of database views. It further adapts later queries to use the optimized persistent views.

17 Claims, 6 Drawing Sheets

(58) Field of Classification Search
CPC . H04L 67/51; H04L 41/5032; H04L 41/5009; H04L 41/22
USPC .......................................................... 707/717
See application file for complete search history.

(56) References Cited

U.S. PATENT DOCUMENTS

| | | | |
|---|---|---|---|
| 2020/0192901 A1* | 6/2020 | Portisch | G06F 16/242 |
| 2020/0334232 A1* | 10/2020 | Arye | G06F 16/215 |
| 2020/0356563 A1* | 11/2020 | Nawrocke | G06F 16/2452 |
| 2021/0165782 A1* | 6/2021 | Deshpande | G06F 16/2393 |
| 2021/0224259 A1* | 7/2021 | Shcherbakov | G06F 16/248 |

* cited by examiner

Take All Tables from FROM Sub-Statement
402

↓

For all Columns, create a node of each column and adds an edge between them signifying they are from the same table
404

↓

For each JOIN in the FROM sub-statement, add an edge signifying the JOIN between the relevant column nodes
406

↓

From the SELECT sub-statement, signify all selected columns as selected in the nodes' feature vector
406

↓

From the SELECT sub-statement, signify all selected columns as selected in the nodes' feature vector
408

↓

For new columns add a new column node, and connect it with an edge from the node used for creation with the edge's features including the generating function
410

↓

For filtering WHERE, create a node for each filter type, create edges for relevant column nodes, create edges between different filter nodes corresponding to logical ops
412

↓

For other operations, create a node and edge to relevant columns
414

AUTOMATED CREATION OF OPTIMIZED PERSISTENT DATABASE VIEWS

TECHNICAL FIELD

Embodiments are generally directed to large-scale data processing, and more specifically to the automatic creation of different database views.

BACKGROUND

Enterprise organizations face vast amounts of information being input and processed by their database systems virtually all the time. Data management becomes critical even more as organizations grow, as many user/admin roles, data assets, domain experts, and processes are constantly being created and added.

In an enterprise system, data assets are typically accessed, transformed, and then utilized many times over during course of a normal business period. The transformation step may be very computationally and space expensive, in addition to having high latency. For example, in a SQL database, data is grouped and aggregated so that tables may be joined, columns may be deleted or new columns may be created according to possibly complex functions, and so on. Because of this constant transformation, database queries that are executed multiple times, or even multiple similar queries that are executed at the same time, may be extremely wasteful.

This has led some companies to maintain many views of the database that are potentially used. Such views are individually created and then stored to provide views that are readily available for different queries. This can result in significant storage costs for large databases, and/or databases queried by various different users. Furthermore, these different views are created manually, thus adding significant processing and personnel overhead.

What is needed, therefore, is a system and method to create different database views automatically and in such a way that they will be optimized in terms of space costs and compute savings.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Figure 1:
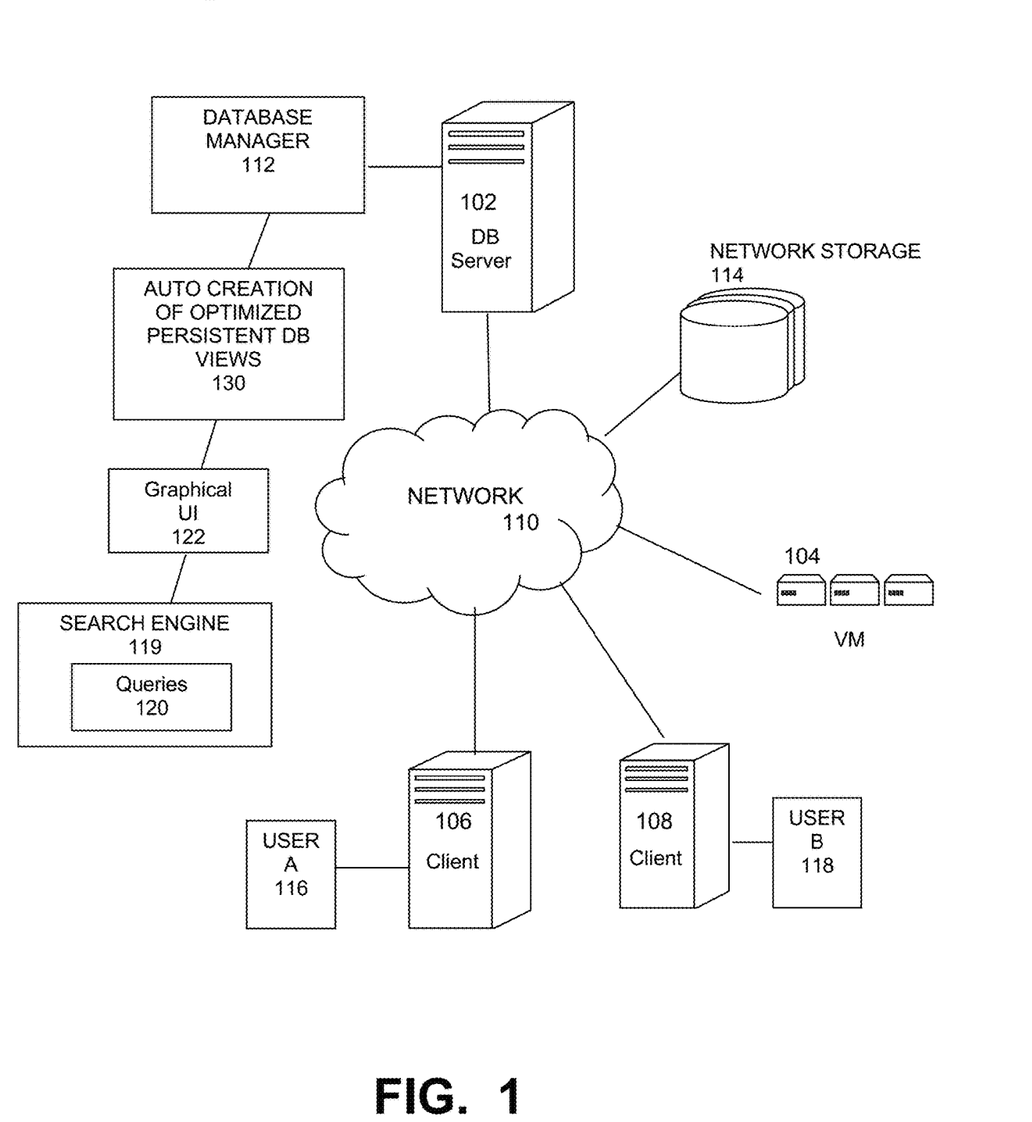
FIG. 1 illustrates a computer network system that implements one or more embodiments of a search engine used in a data lake storage system, under some embodiments.

FIG. 1 illustrates a computer network system that implements one or more embodiments for automated creation of optimized data material views of a databases for different users and applications, under some embodiments. In system 100, client and server computers are coupled directly or indirectly to each other and other network elements through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application.

The data generated or sourced by system 100 may be stored in any number of persistent storage locations and devices, such as network storage 114. A backup process backs up this data to storage devices of the network, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (Open-Storage) devices.

The data stored and processed in system 100 may be any appropriate data, such as database data that is part of a database management system. In this case, the data may reside on one or more hard drives and may be stored in the database in a variety of formats. One example is an Extensible Markup Language (XML) database, which is a data persistence software system that allows data to be stored in XML format. Another example is a relational database management system (RDMS) which uses tables to store the information. For the embodiment illustrated in FIG. 1, it is assumed that a variety of different applications and databases may reside in various storage sites, such as network storage 114, cloud network 110, VMs or data centers 104, and so on. Such data may be accessed and/or managed by a database server 102 that runs a database manager 112.

In an embodiment, the databases may be created using SQL (Structured Query Language) databases, which is designed for data stored in a relational database management system (RDBMS). Embodiments, however, are not so limited and other database types can also be used, such as NoSQL (non-relational), or others.

In an embodiment, system 100 represents a large-scale data processing system that includes a large repository of data storage devices 114 which are accessed by a large numbers of users each operating respective client devices, such as users 116 (user A) and 118 (user B). System 100 represents a big data environment that includes data analytics processes used by a plurality of different users. The users are typically part of a very large organization (e.g., company, governmental agency, conglomeration, etc.) that may be referred to as an "enterprise" and that is organized into a number of different business units, such as sales, engineering, customer service, and so on. Many different structures are possible depending on the organization's size, type, hierarchical configuration, and so on, but are typified by a separation of employees and personnel into a number of separate and autonomous or semi-autonomous groups or departments.

Big data generally refers to data sets that are so large (e.g., terabyte scale datasets) or complex that traditional data processing and interchange applications are inadequate. Special programs are thus used for various data processing tasks, such as data capture, analysis, storage, transfer, virtualization, querying, security, and so on. Users often use applications or programs to run predictive analytics or certain other advanced methods to extract value from data, which can be very large and/or complex sets of data.

To access the data provided by the different databases, a search engine process 119 is utilized to submit queries through the database server 102 to the various data sources. In an embodiment, the search engine 119 examines a body of data in a systematic way for particular information specified in a textual search query input by a user. The body of data may be World Wide Web content, such that the search engine performs web searches, or it may be any other body of accessible data, either public or private. The search engine may employ one or more indexing schemes that associate words and other definable tokens to location or storage information (e.g., associating web pages to their domain names and HTML-based fields). A query from a user can be a single word, multiple words or a sentence, and the index helps find information relating to the query as quickly as possible. A user enters a query 120 into the search engine as one or more keywords, and the index already has the names of the sites or locations containing the keywords, and these are instantly returned in response to the query from the index. If more than one response is returned for a query, they can be ranked in order of most to least relevant to the query based on number or closeness of keyword matches, and so on. The search engine 119 may be a component within the server 120, or it may be provided as separate functional components in system 100, or as a cloud-based service, and so on.

Finding data in present systems typically involves using a keyword-based search engine that simply matches query terms entered into the search engine with instances of the terms in the searched data assets. A certain number of data assets containing a highest number of matches is then returned to the user, who must then access and evaluate each returned data asset.

A data query may constitute constitutes of the following parts:
 (1) Base objects (such as tables or databases)
 (2) Data columns or metadata
 (3) Data joins and merges (4) Filters and flags
(5) Overlay functions (such as used to create new data columns, groupings)
(6) Later splits (such as train-eval-test)

Other query level information, such as frequency of runs, can used for differentiated weighting of data samples or graph-level features.

Figure 2:
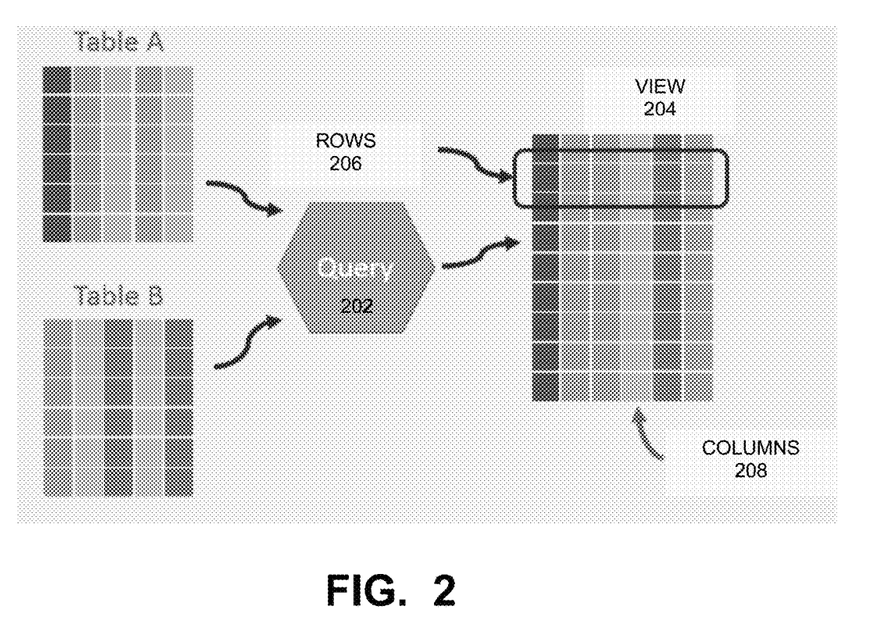
FIG. 2 illustrates the generation of a view from a SQL database, under some embodiments.

A SQL database (or any other similar database) is typically comprised of data organized in a large table comprising a number of rows and columns. This data can be viewed and processed in any appropriate organization or set of sub-tables. Views are virtual tables that hold data from one or more tables that are stored in the database. A view does not contain any data itself, it is a set of queries that are applied to one or more tables that are stored within the database as an object. A view can be created using the tables of the same database or different databases, and different queries can generate different views, FIG. 2 illustrates the generation of a view from a SQL database, under some embodiments. As shown in FIG. 2, view 204 has been created from the columns of two tables, Table A and Table B, using a query 202. A view is created using a select statement, and are generally stored in the database as an object. For this example embodiment, the rows and columns of Tables A and B become the rows 206 and columns 208 of view 204. FIG. 2 is provided for purposes of illustration only, and databases and views may generated by any similar combination or division of database elements.

In an embodiment, a given textual query 120 is tokenized to its constituent parts, which will become nodes and edges in a heterogeneous graph. For this embodiment, the system 100 processes queries 120 in graph form. As different queries may have commonalities (which are seen as sub-graphs, which should include a given node in both and a similar edge), a common part of some queries can be used as a materialized view, and then each query will take this as a basis and add the other parts of the query graph as the query operation. It should be noted that a query may utilize multiple materialized views (multiple common subgraphs are included in it).

In an embodiment, the queries are processed in an artificial intelligence (AI) or machine learning (ML) system that uses graph and natural language processing (NLP) based algorithms, while training analyze connections between data elements, the filters used, and the importance and validity of these queries.

Figure 3A:
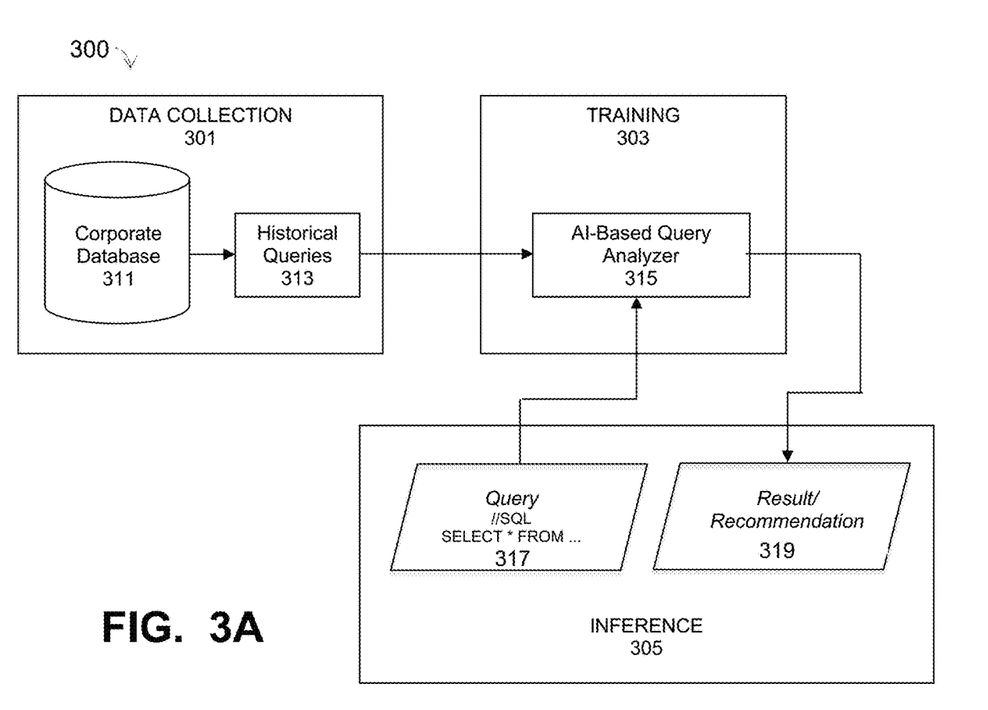
FIG. 3A illustrates an AI/ML system that processes queries for use in the automatic creation of optimized persistent database views, under some embodiments.

FIG. 3A illustrates an AI/ML system that processes queries for use in the automatic creation of optimized persistent database views, under some embodiments. System 300 of FIG. 3A includes a data collection component 301, a training component 303, and an inference component 305. The data collection component 301 comprises various data sources such as corporate databases (e.g., SQL databases) 311 and a body of historical queries and associated metadata 313. The data collection component 301 continuously monitors and collects the historical queries and metadata 313, and such associated metadata could include data objects, submitter, submitter position/role, frequency of runs, flags, filters, and so on.

This information is submitted to the training component 303 through an AI-based query analyzer 315. This component continuously trains a machine learning NLP, graph-based algorithm to identify the data sources, and connections between the data sources to thereby determine the most frequently used data sources, join keys, filtering flags, and so on. The inference engine 305 also continuously trains the AI/ML algorithms through queries 317, and the training component then returns results or recommendations, such as "you should inspect the following datasets . . . , they are usually joined this way . . . the following filters are usually applied . . . ," and so on.

In an embodiment, the AI/ML system 300 of FIG. 3 uses graph-based processes to generate a graph representation of the queries 317 that generate the different database views. Such a graph generally provides a convenient way to see shared parts between different queries.

Figure 3B:
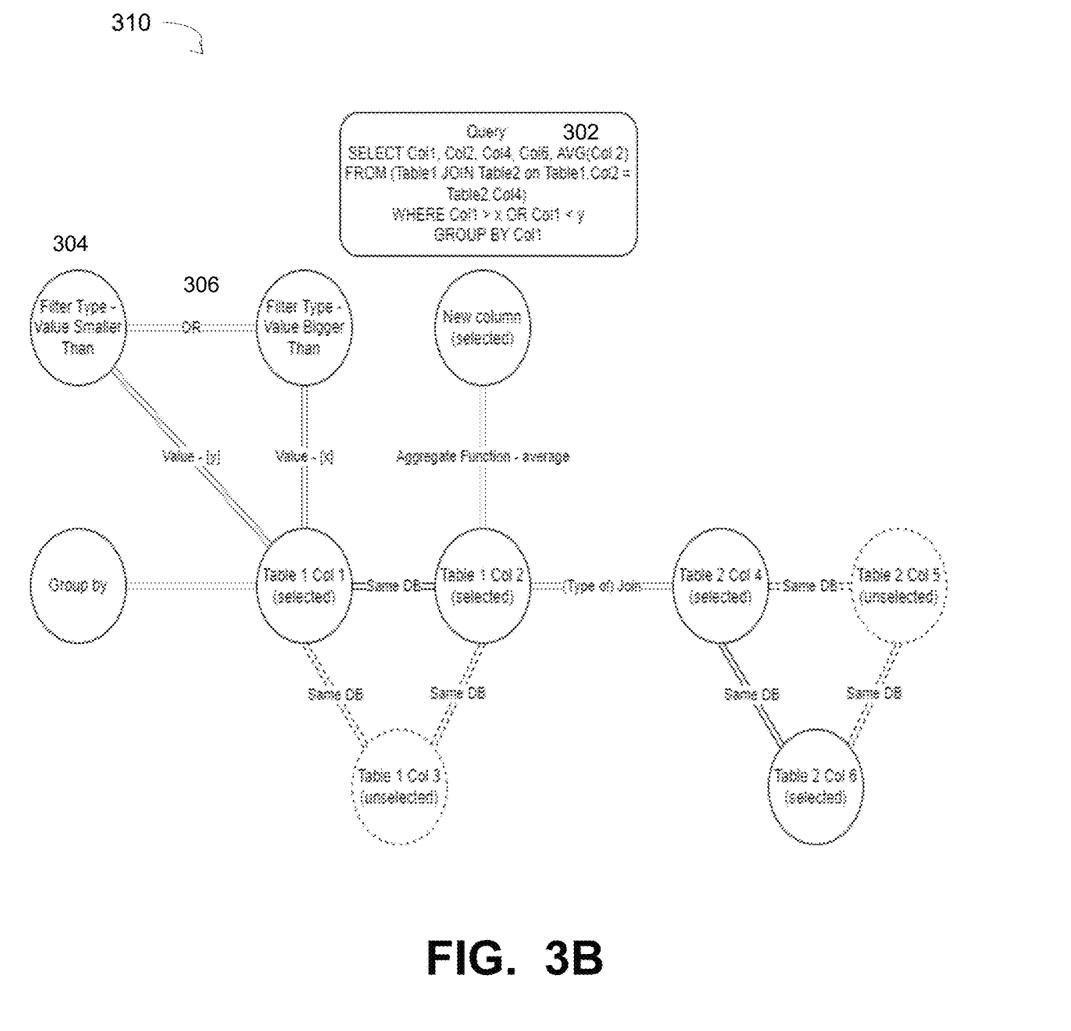
FIG. 3B illustrates a graph representation of an SQL query, under some embodiments.

FIG. 3B illustrates a possible heterogeneous graph representation for a query of an SQL database. It should be noted that the same concept can be directly applied to NoSQL databases using metadata tagging etc. In FIG. 3B As shown in diagram 310 of FIG. 3B, the circular elements 304 represents some of the parts of a data query outlined above, such as filter, group, table, operation, and so on. These elements are joined together by one or more edges 306, where the different edges have different edge types by relationship between the joined elements 304. For the example of FIG. 3B, the graph 300 is generated by query 302, which is as follows: SELECT Col1, Col2, Col4, Col6, AVG(Col 2) FROM (Table1 JOIN Table2 on Table1.Col2=Table2.Col4) WHERE Col1>x OR COL1<y GROUP by Col1.

Graph 310 of FIG. 3B illustrates certain graph components, such as SELECT, JOIN, etc. Other components include filtering and the OR relationship between them, the group by and the creation of the new column using the aggregate function (average), and others. FIG. 3B is provided for purposes of illustration only, and embodiments are not so limited, and any other graph is also possible.

As shown in FIG. 3B, the query 302 comprises certain action terms, such as SELECT, FROM, JOIN, and so on. These terms are used to generate the graph representation of the query. Such commands are SQL commands, and many other such commands are possible, such as BETWEEN, LIKE, AS, IN, and so on as specified in the SQL language. Embodiments may also use other databases and query operators as appropriate.

Figure 4:
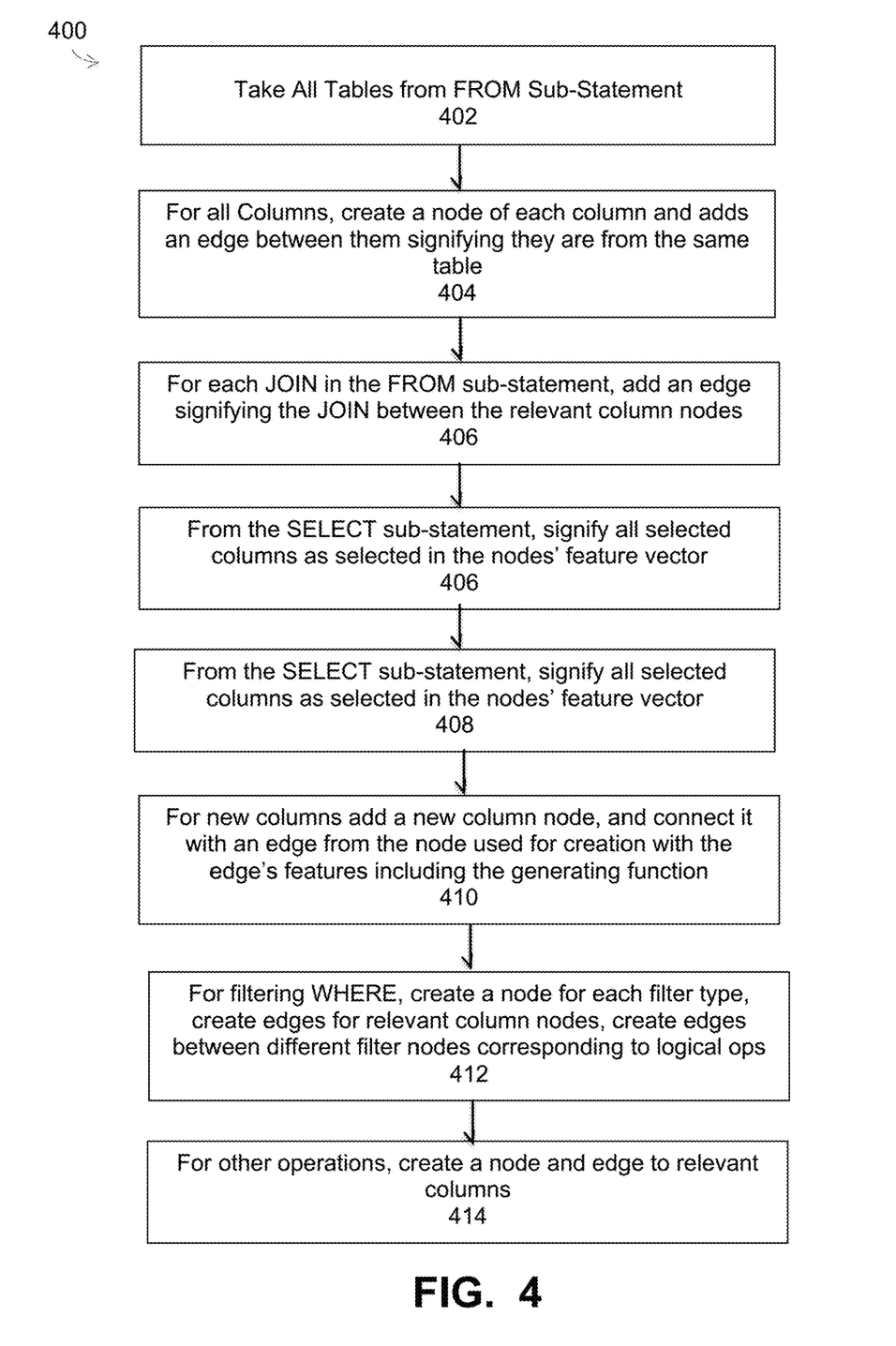
FIG. 4 is a flowchart that illustrates a method of generating a graph representation of a query, under some embodiments.

FIG. 4 is a flowchart that illustrates a method of generating a graph representation of a query, under some embodiments. As shown in FIG. 4, process 400 begins by taking all tables from the FROM sub-statement, 402. For all columns in a table, the process creates a node of each column and adds an edge between them signifying they are from the same table, 404. For each JOIN in the FROM sub-statement, the process adds an edge signifying the JOIN between the relevant column nodes, 406.

From the SELECT sub-statement, the process signifies all selected columns as selected in the nodes' feature vector, 408. For new columns (e.g., an average of a column) the process adds a new column node, and connects it with an edge from the node used for creation with the edge's features including the generating function (e.g., average (AVG) function), 410.

For filtering a WHERE sub-statement, for each filter type create a node for it, create edges for the relevant column nodes, and create edges between different filter nodes corresponding to the logic operations between them, 412

For other operations such as GROUP_BY, the process creates a node for them and create an edge to the relevant column or columns, 414.

The graph representation of the data queries is used by process 130 through a graphical user interface process or component 122.

Given an database of queries in graph form, such as shown in FIG. 3B, the system can use a reconstructive self-supervised (SSL) model of graph neural networks (GNNs) or generative flow networks. The training process 303 takes the query graph and masks part of it and train a GNN to try to reconstruct it. At inference time, the model will then generate database views for other queries 317 using the shared parts among the queries.

As stated in the Background section, enterprise data assets are accessed, transformed, and utilized many times over. The transformation can be very expensive and impose high system latency. Though one approach is to maintain different views of the database to reduce latency, this imposes significant storage costs and requires manual production of each view. In an embodiment, the graph representation for database queries, such as shown in FIG. 3B is used to automatically create optimized persistent database views, under some embodiments.

As shown in FIG. 2, a database view is the result set of a query against the database. A view is generally a virtual table computed or collated dynamically from the database data when access to that view is requested. Changes to the data in an underlying table are reflected in the data displayed in subsequent invocations of the view (automatically for dynamic views or manually for static views). Views can represent a subset of the data contained in a table, and thus can limit the degree of exposure of the underlying tables, such as if a user has permissions to query a particular view but is denied access to the rest of the base table.

Database views are saved in the database as named queries and can be used to save frequently used, complex queries. There are generally two types of database views: dynamic views and static views. Dynamic views can contain data from one or two tables and automatically include all of the columns from the specified table or tables. These are automatically updated when related objects or extended objects are created or changed. Static views can contain data from multiple tables and the required columns from these tables must be specified in the SELECT and WHERE clauses of the static view. Static views must be manually updated when related objects or extended objects are created or changed. Database views are populated depending on the object on which they are based.

As stated above, certain views of a database are frequently generated, such as based on frequently used queries. Such views are at present generated manually and may be stored to be readily available for future queries. This is a processor (CPU) and storage (memory) intensive procedure.

In marked contrast to present systems, embodiments of system 100 include an automated process 130 that automatically creates database views and such that they will be optimized in terms of space costs and compute savings.

Figure 5:
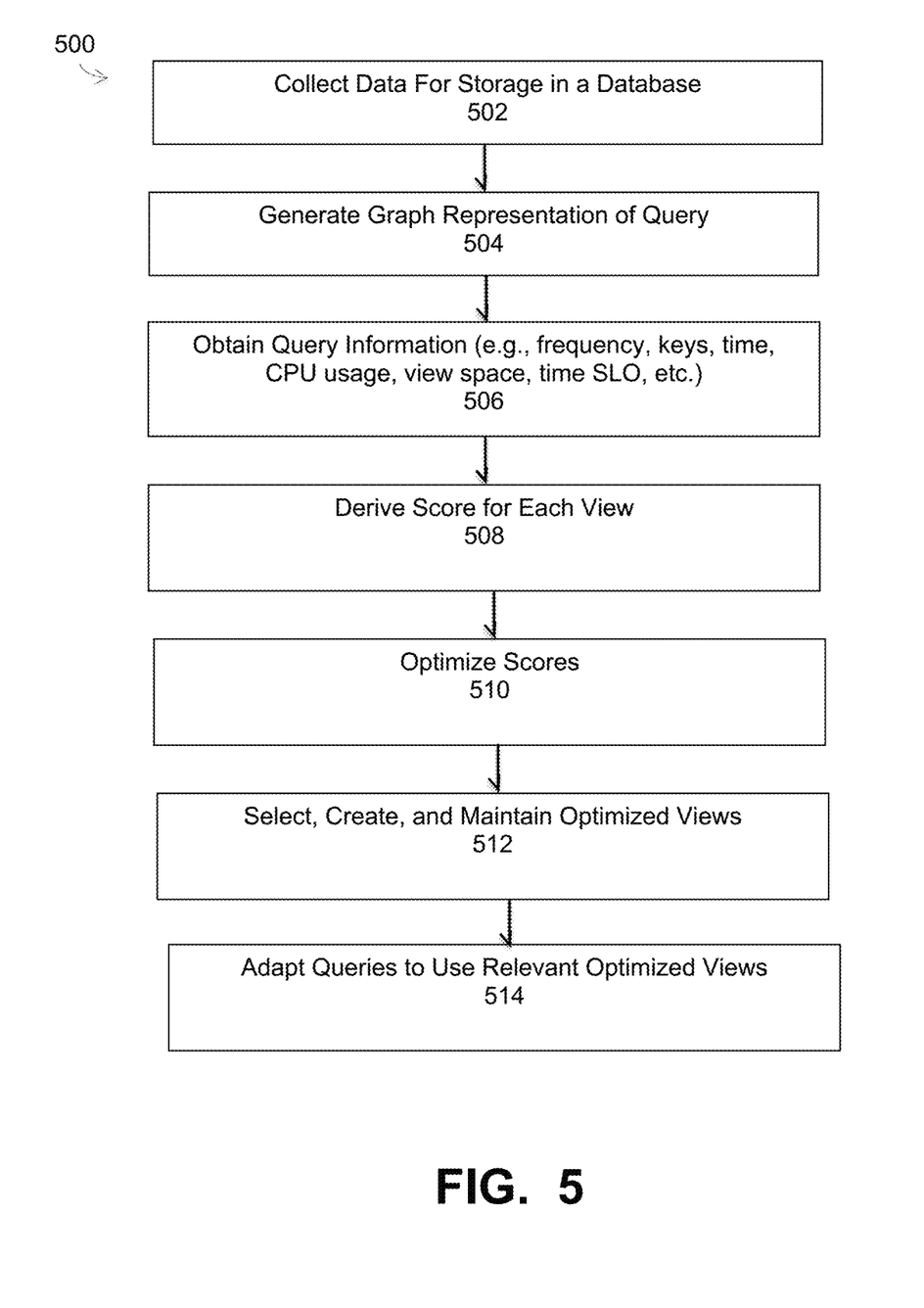
FIG. 5 is a flowchart that illustrates a method of automatically creating optimized persistent database views, under some embodiments.

FIG. 5 is a flowchart that illustrates a method of automatically creating optimized persistent database views, under some embodiments. In an embodiment, the different possible views are defined by the query 120 executed by the search engine 119, and creating them involves the processing steps of first definition and then creation.

As shown in FIG. 5, process 500 starts with the collection data and storage in a database, 502. For each query, the process generates a graph representation of the query (e.g., FIG. 3B), 504. The queries as provided in graph form leverage the fact that different queries may have commonalities where a common part of some queries can be used as a materialized view. Each query will then take this as a basis and add the other parts of the query graph as the query operation. The graph generally provides a convenient way to see shared parts between different queries, but it is not strictly required to these identify shared parts.

For each query, the process next obtains query information, 506. This can include, the frequency that the query is executed, and certain characteristics including: the key or keys, the mean, max and median time that it has taken (and/or other statistics), the mean, max and median CPU usage (and/or other statistics), the space of the resulting intermediate view, the column identities in the resulting view (different queries may create a similar column, thus having a similar identity), and so on. Additional characteristics may include the time SLO (service level objective), which is optional and can be provided by admin personnel. Such information may be referred to as query 'telemetry' information.

In step 508, the process derives a score for each view. Any appropriate function or formula can be used to derive a score that integrates the collected information. The scoring function can be formulated by the user depending on their required or desired compromises between memory/CPU usage, SLA requirements, time required, and so on. For example, the goal may be to optimize a score for a set of maintained views, 510. During this optimization, the base score for a view is increased by a factor the more it saves from the time required and/or CPU usage, or decreased if the space requires more or excessive space, or if the queries do not adhere to time SLAs (service level agreements).

An example of the scoring process may be a minimization objective based on: CPU usage of known queries given the views*alpha+time for known queries given the views*beta+ space the views are taking*gamma+(binary) is there one query or more that does not adhere to its given time SLA?*delta. In this formula, alpha, beta, gamma and delta are given scalar coefficients. This formula is provided for purposes of illustration only, and any other formula may be used based on user needs and system configuration.

In an embodiment, the optimization step 510 can be done as a genetic algorithm that takes subgraph 'seeds' and expands or shrinks them with the optimization metric calculated by the base score plus/minus any relevant factors. The tradeoff here is lowering the time that queries take versus the space taken by the materialized views. This is the performed as part of the automated process 130.

The evolution operators for optimizing the views' scores are as follows: (1) adding or removing a view (starting from its key column(s) from the set of keys in the queries), and (2) adding or removing a column from a view. It should be noted that adding a column to a view is possible only if the view has a similar key to the column's intermediate view's original key. The optimized set of views is then selected, after which, they will be created and maintained, 512. After this, queries will be adapted to begin computation from the relevant views instead of from their original start point, 514.

Figure 6:
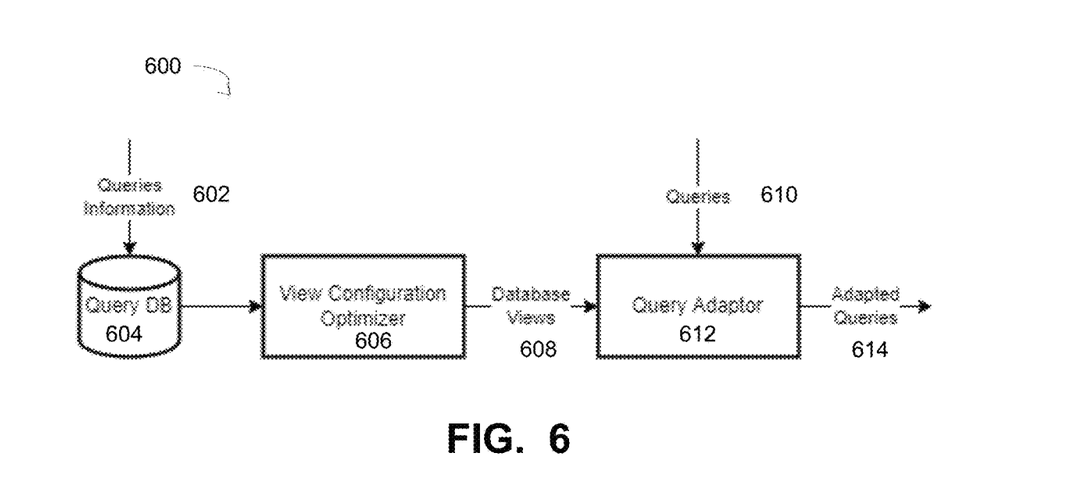
FIG. 6 is a block diagram for a system automatically creating and optimizing database views, under some embodiments.

FIG. 6 is a block diagram for a system 600 automatically optimizing and persisting database views, under some embodiments. FIG. 6 illustrates a system for producing adapted queries based on the generated and optimized database views generated in process 500 of FIG. 5. As shown in FIG. 6, system 600 includes a query database 604 storing query information 602. The queries are processed by the view configuration optimizer 606 executing process 500 to generate the database views 608.

The system of FIG. 6 performs the database view optimization and persistence by receiving queries made to a database, wherein each query generates a respective database view, and generating a set of database maintained views generated by the queries. It obtains, for each generated view, certain telemetry information about a respective view including latency, memory space utilization, and processor utilization, among other factors. It then score each view of the generated views based on an base score modified by the obtained information to determine which one or more of the generated views to make persistent, and maintains the one or more persistent views to produce an optimized persistent set of database views. It further adapts later queries to use the optimized persistent views.

In an embodiment, a genetic algorithm is used for the optimizer 606. A genetic algorithm (GA) is an optimization algorithm that is inspired from natural selection principles. It is a population based search algorithm, which utilizes the concept of survival of fittest. The new populations are produced by iterative use of genetic operators on individuals present in the population. The chromosome representation, selection, crossover, mutation, and fitness function computation are the key elements of GA. The procedure of GA is as follows. A population (Y) of n chromosomes are initialized randomly. The fitness of each chromosome in Y is computed. Two chromosomes say C1 and C2 are selected from the population Y according to the fitness value. The single-point crossover operator with crossover probability (Cp) is applied on C1 and C2 to produce an offspring say O. Thereafter, uniform mutation operator is applied on produced offspring (O) with mutation probability (Mp) to generate O'. The new offspring O' is placed in new population. The selection, crossover, and mutation operations will be repeated on current population until the new population is complete.

The database views 608 and actual queries 610 are input to a query adapter component 612 for output as adapted queries 614. The adapted queries are then used as queries to the optimized views (as shown in step 514 of FIG. 5).

Embodiments thus provide for the automatic creation and optimization of database views configuration using genetic algorithms. This effectively reducing human work for creating useful database views, and improves organizational database system performance. Embodiments use machine learning, graph and NLP based algorithms that would, while training, analyze connections between data elements, the appropriate filters used, and the importance and validity of these queries in generating the optimized views.

Embodiments of the processes and techniques described above can be implemented on any appropriate backup system operating environment or filesystem, or network server system. Such embodiments may include other or alternative data structures or definitions as needed or appropriate.

Figure 7:
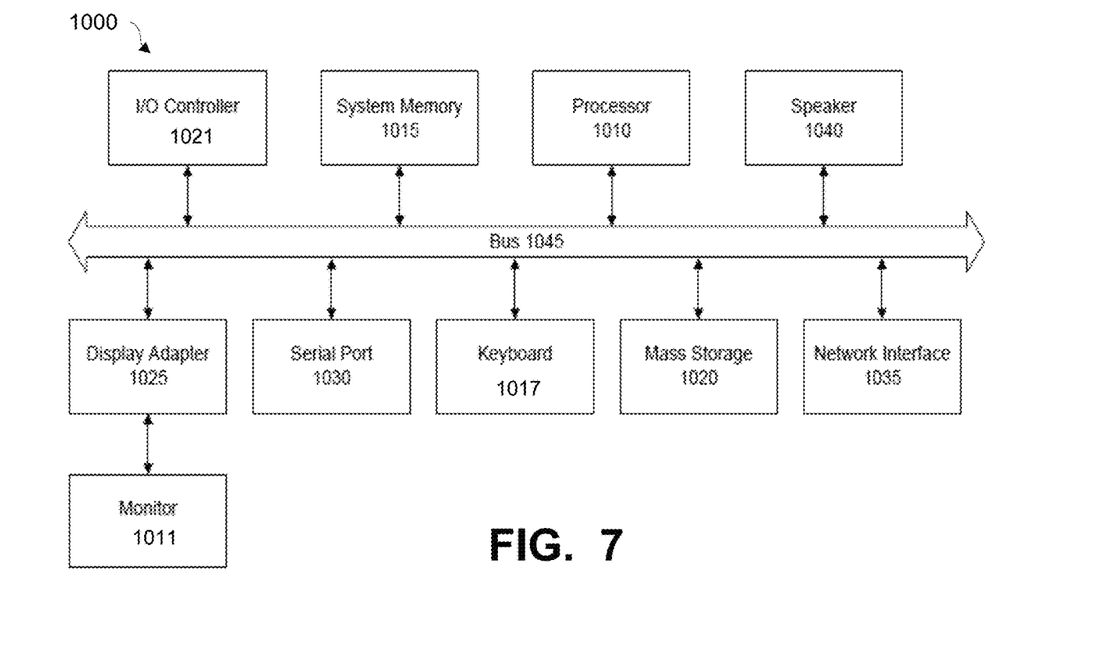
FIG. 7 is a system block diagram of a computer system used to execute one or more software components of the methods and processing component described herein, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 7 is a block diagram of a computer system used to execute one or more software components of the present system described herein. The computer system 1000 includes a monitor 1011, keyboard 1017, and mass storage devices 1020. Computer system 1000 further includes subsystems such as central processor 1010, system memory 1015, I/O controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 is only one example of a computer system suitable for use with the present system. Other configurations of subsystems suitable for use with the present invention will be readily apparent to one of ordinary skill in the art.

The network 110 may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x, near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

For the sake of clarity, the processes and methods herein have been illustrated "with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. Method steps may also be embodied as executable program code executed in a processor based system, such as a server computer or client computer coupled in a network. The terms, "component," "module," "procedure," "unit," "engine" may all refer to a circuit that executes program code to perform a function implemented in software.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media). In the context of this disclosure, a computer-usable medium or computer-readable medium may be any physical medium that can contain or store the program for use by or in connection with the instruction execution system, apparatus or device.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of optimizing and persisting database views in a large-scale data processing system, comprising:
    receiving queries made to a database through a processor-based search engine, wherein each query generates a respective database view;
    tokenizing each query into respective constituent parts, each of which form nodes and edges in a heterogeneous graph such that common parts of queries are used as a materialized view;
    generating a set of database maintained views generated by the queries, wherein each view comprises a dynamically generated virtual table holding data generated by queries applied to one or more tables in the database;
    generating, for each query, a graph representation of the query that as a query graph that shows commonalities with other queries through the common parts indicated by the materialized view;
    obtaining, for each generated view, telemetry information about a respective view including latency, memory space utilization, and processor utilization;
    calculating a base score for each generated view using a scoring function based on a minimization objective combining as a sum, the processor utilization plus a query time for each respective database view plus the memory space utilization;
    scoring, by a processor-based component, each view of the generated views based on the base score modified by the obtained information to determine which one or more of the generated views to make persistent;
    maintaining, through a computer graphical user interface (GUI), the one or more persistent views to produce a set of optimized persistent database views; and
    using a reconstructive self-supervised (SSL) model of graph neural networks (GNN) to generate a database view of other queries using the common parts to produce the set of optimized persistent database views to thereby save resources when processing queries by leveraging the commonalities.

2. The method of claim 1 wherein the base score is modified by:
    increasing the base score for any savings of time or any savings of CPU usage for a corresponding view;
    decreasing the base score in relation to an amount of increased memory space the corresponding view requires; and
    decreasing the base score if a corresponding query does not conform to a service level agreement.

3. The method of claim 2 wherein the set of optimized persistent views is produced by at least one of adding or removing a view from the generated views, or adding or removing a column from a view of the generated views, and further wherein the method comprises masking part of the query graph and training a GNN to reconstruct it to generate the set of optimized persistent database views.

4. The method of claim 1 wherein each query of the queries comprises data elements including base objects including tables, data columns, data joins, filters, and overlay functions.

5. The method of claim 1 further comprising processing the queries through an artificial intelligence/machine learning (AI/ML) process that utilizes historical query data and metadata to identify data sources and connections the data sources to return recommendations used to produce the set of optimized persistent database views.

6. The method of claim 5 wherein the graph representation comprises the data elements represented as nodes and connected to one or more other nodes through edges classified by relationship between any two connected nodes.

7. The method of claim 6 further comprising drawing the graph representation by:
    taking all tables from a 'from' sub-statement;
    creating a node for each column in a table and adding an edge between nodes that are from a same table;
    adding an edge signifying a 'join' between relevant column nodes for each join in the 'from' sub-statement; and
    signifying, from a 'select' sub-statement all selected columns as selected in a corresponding node's feature vector.

8. The method of claim 4 wherein the database comprises a Structured Query Language (SQL) database, and wherein the data processing system is maintained by a large scale enterprise, and wherein the database stores Big Data-scale data sets and is stored in storage devices organized into arrays.

9. The method of claim 8 wherein the data processing system comprises a search engine processing the queries from the target user, the search engine returning one or more data asset recommendations responsive to the queries and the adapted later queries.

10. The method of claim 1 wherein the obtained information further comprises frequency of the query, query keys, and service level requirements, and wherein the latency comprises a time required to return results for the query.

11. The method of claim 4 wherein the maintaining step executes an optimization method comprising a genetic algorithm (GA) that iteratively uses genetic operators to create a set of optimized views using chromosome representation, selection, crossover, mutation, and fitness function computation.

12. A method of processing queries input to a data retrieval system storing a database for access by users in an enterprise, comprising:
    storing, by a processor-based component, query information for a plurality of queries in a query database, each query input through a processor-based search engine and generating a respective view of the database to form a plurality of generated views, wherein each query is tokenized into respective constituent parts, each of which form nodes and edges in a heterogeneous graph such that common parts of queries are used as a materialized view;
    calculating a base score for each generated view using a scoring function based on a minimization objective combining as a sum of processor utilization plus a query time for each generated view plus a memory space utilization of each generated view;
    generating, for each query, a graph representation of the query that as a query graph that shows commonalities with other queries through the common parts indicated by the materialized view;
    generating, in a view configuration optimizer, a set of optimized views for display through a computer graphical user interface (GUI) of the database for the queries, the optimizer performing at least one of: of adding or removing a view from the maintained views, or adding or removing a column from a view of the maintained views, based on an optimized score from the base score for each generated view; and
    using a reconstructive self-supervised (SSL) model of graph neural networks (GNN) to generate a database view of other queries using the common parts to produce the set of optimized views; and
    inputting, through a computer interface, the optimized views into a query adapter of the search engine that takes the plurality of queries and generates a set of adapted queries corresponding to the optimized views to thereby save resources when processing queries by leveraging the common parts of the queries.

13. The method of claim 12 wherein the optimizing step comprises modifying the base score by:
    increasing the base score for any savings of time or any savings of CPU usage for a corresponding view;
    decreasing the base score in relation to an amount of increased memory space the corresponding view requires; and
    decreasing the base score if a corresponding query does not conform to a service level agreement.

14. The method of claim 13 wherein the minimization objective is based on obtained information comprising frequency of the query, query keys, time required to return results for the query, CPU usage to process the query, and memory space consumed by each view generated by the query.

15. The method of claim 12 further comprising generating a graph representation of each query, a query generating a respective view of the views, wherein each query of the queries comprises data elements including base objects including tables, data columns, data joins, filters, and overlay functions.

16. The method of claim 15 wherein the graph representation comprises the data elements represented as nodes and connected to one or more other nodes through edges classified by relationship between any two connected nodes.

17. The method of claim 16 wherein each query of the queries uses the common parts as a basis and adds other non-common parts of the graph representation as a query operation, the method further comprising:
    masking part of the query graph and training a GNN to reconstruct it to generate the set of optimized persistent database views; and
    processing the queries through an artificial intelligence/machine learning (AI/ML) process that utilizes historical query data and metadata to identify data sources and connections the data sources to return recommendations used to produce the set of optimized persistent database views.

* * * * *